(12) United States Patent
Bijlenga et al.

(10) Patent No.: US 6,995,994 B2
(45) Date of Patent: Feb. 7, 2006

(54) CONVERTER AND A METHOD FOR CONTROLLING A CONVERTER

(75) Inventors: Bo Bijlenga, Åmål (SE); Peter Lundberg, Västerås (SE); Tomas Jonsson, Västerås (SE); Nicklas Johansson, Uppsala (SE); Esie Ramezani, Möriken (CH)

(73) Assignee: ABB AB, Vasteras (SE)

( * ) Notice: Subject to any disclaimer, the term of this patent is extended or adjusted under 35 U.S.C. 154(b) by 70 days.

(21) Appl. No.: 10/488,289

(22) PCT Filed: Sep. 17, 2002

(86) PCT No.: PCT/SE02/01667

§ 371 (c)(1),
(2), (4) Date: Mar. 2, 2004

(87) PCT Pub. No.: WO03/026118

PCT Pub. Date: Mar. 27, 2003

(65) Prior Publication Data

US 2004/0240240 A1    Dec. 2, 2004

(30) Foreign Application Priority Data

Sep. 21, 2001    (SE)    .................................... 0103141

(51) Int. Cl.
*H02H 7/00*    (2006.01)

(52) U.S. Cl. .................................... 363/51; 363/56.03

(58) Field of Classification Search .................. 363/17, 363/35, 36, 41, 51, 56.01, 56.02, 56.03, 56.04, 363/132
See application file for complete search history.

(56) References Cited

U.S. PATENT DOCUMENTS

| 6,172,882 B1 | 1/2001 | Tanaka et al. |
| 6,603,675 B1 * | 8/2003 | Norrga .................. 363/132 |
| 6,898,095 B2 * | 5/2005 | Bijlenga et al. ........... 363/132 |

FOREIGN PATENT DOCUMENTS

| EP | 0 712 201 | 5/1996 |
| GB | 1 465 757 | 3/1977 |

* cited by examiner

*Primary Examiner*—Jessica Han
(74) *Attorney, Agent, or Firm*—Buchanan Ingersoll PC

(57) ABSTRACT

The invention relates to a converter provided with a resonant circuit (16), which converter comprises a device (31) for measuring the derivative (dI/dt) of the current through the current valves 82, 3) and a detection device (32) co-operating with said measuring device (31) for detecting a short-circuit in the converter, the detection device (32) being adapted to detect a short-circuit current when the current derivative (dI/dt) measured by the measuring device (31) is equal to or exceeds a stipulated current derivative limit value ($dI/dt_{lim}$) during a length of time exceeding a stipulated time limit value ($t_{lim}$). The invention also relates to a method for controlling such a converter.

33 Claims, 4 Drawing Sheets

CONVERTER AND A METHOD FOR CONTROLLING A CONVERTER

FIELD OF THE INVENTION AND PRIOR ART

The present invention relates to a converter according to the preamble of claim 1 and a method for controlling such a converter.

The invention particularly relates to a VSC-converter. A VSC-converter for connection between a direct voltage network and an alternating voltage network is previously known e.g. from the thesis "PWM and control of two and three level high voltage source converters" by Anders Lindberg, Royal Institute of Technology, Stockholm, 1995, in which publication a plant for transmitting electric power through a direct voltage network for high-voltage direct current (HVDC), while utilizing such converters, is described. Before the creation of this thesis, plants for transmitting electric power between a direct voltage network and an alternating voltage network have been based upon the use of network commutated CSC (Current Source Converter)-converters in stations for power transmission. However, in this thesis a totally new concept is described, which is based on instead using VSC (Voltage Source Converter)-converters for forced commutation for transmitting electric power between a direct voltage network being voltage stiff therethrough, in the case in question for high-voltage direct current, and alternating voltage networks connected thereto, which offers several considerable advantages as compared to the use of network commutated CSC-converters in HVDC, among which it may be mentioned that the consumption of active and reactive power may be controlled independently of each other and that there is no risk of commutation faults in the converters and thereby no risk of commutation faults being transmitted between different HVDC-links, as may occur with network commutated CSC:s. Furthermore, it is possible to feed a weak alternating voltage network or a network without any generation of its own (a dead alternating voltage network). There are also further advantages.

The inventive converter may be included in a plant for transmitting electric power through a direct voltage network for high-voltage direct current (HVDC), in order to e.g. transmit the electric power from the direct voltage network to an alternating voltage network. In this case, the converter has its direct voltage side connected to the direct voltage network and its alternating voltage side connected to the alternating voltage network. The inventive converter may however also be directly connected to a load, such as a high-voltage generator or motor, in which case the converter has either its direct voltage side or its alternating voltage side connected to the generator/motor. The invention is not limited to these applications; on the contrary, the converter may just as well be used for conversion in a SVC (Static Var Compensator) or a back-to-back-station. The voltages on the direct voltage side of the converter are with advantage high, 10–400 kV, preferably 130–400 kV. The inventive converter may also be included in other types of FACTS-devices (FACTS=Flexible Alternating Current Transmission) than the ones mentioned above.

VSC-converters are known in several designs. In all designs, a VSC-converter comprises a number of so-called current valves, each of which comprising a semiconductor element of turn-off type, such as an IGBT (Insulated Gate Bipolar Transistor) or a GTO (Gate Turn-Off Thyristor), and a rectifying member in the form of a diode, a so-called free wheeling diode, connected in anti-parallel therewith. Each semiconductor element of turn-off type is normally in high-voltage applications built up of several series connected, simultaneously controlled semiconductor components of turn-off type, such as several separate IGBT:s or GTO:s. In high-voltage applications a comparatively high number of such semiconductor components is required in order to hold the voltage to be held by each current valve in the blocking state. In the corresponding manner, each rectifying member is built up of several series connected rectifying components. The semiconductor components of turn-off type and the rectifying components are in the current valve arranged in several series connected circuits, each of which circuits comprising i.a. a semiconductor component of turn-off type and a rectifying component connected in anti-parallel therewith.

In order to limit the turn-off losses in the semiconductor elements of turn-off type of the current valves of the converter, i.e. the losses in the semiconductor elements of turn-off type when these are turned off, it is previously known to arrange capacitive members in the form of so-called snubber capacitors connected in parallel across the respective semiconductor element of turn-off type. It is also known to provide the converter with a so-called resonant circuit for recharging said snubber capacitors in connection with commutation of the phase current. Hereby, it will also be possible to limit the turn-on losses in the semiconductor elements of turn-off type of the current valves, i.e. the losses in the semiconductor elements of turn-off type when these are turned on.

A number of different types of essentially lossless commutation circuits based upon inductances and capacitances have been developed and come into use in order to lower the losses of VSC-converters in connection with commutation. These types of converters are denominated "soft switched converter". ARCPC-converters (Auxiliary Resonant Commutated Pole Converter) may be mentioned as an example of such converters. These converters comprise a resonant circuit adapted to achieve a recharge of the snubber capacitors of the current valves in connection with commutation of the phase current from a rectifying member of a current valve to a semiconductor element of turn-off type of another current valve so that said semiconductor element can be turned on at low voltage instead of high voltage, whereby the turn-on losses in the semiconductor element of the current valve is limited. The resonant circuit is also used when the phase current is commutated from a semiconductor element of turn-off type of a current valve to a rectifying member of another current valve, i.e. in connection with turn-off of a semiconductor element of the first current valve, when the phase current is so low that the switching time for the voltage in the phase output otherwise would be unreasonably long.

In certain cases short-circuit currents may occur in the current valves of the converter, and it is then necessary to be able to treat these in such a manner that the semiconductor components of turn-off type of the current valves will not break down. Such short-circuit currents may for instance ensue in that a prohibited turn-on of a current valve takes place at the same time as a current valve with opposite polarity is conducting, which for instance may be caused by an error in the control equipment that controls the turn-on and turn-off of the semiconductor components of turn-off type of the current valves. In such a case, the current through the current valves will rise rapidly until the current saturation level of the semiconductor components of turn-off type of the current valves has been reached. When the current saturation level has been reached in a semiconductor component of turn-off type, it will be difficult and often impossible to turn it off. Therefore, there is a need of being able to very rapidly detect occurring short-circuit currents in a converter so as to create possibilities for carrying out required measures for protecting the semiconductor components of turn-off type of the current valves before they have reached the current saturation level.

OBJECT OF THE INVENTION

The object of the present invention is to make possible an efficient and rapid detection of a short-circuit current occurring in a current valve of a converter.

SUMMARY OF THE INVENTION

According to the invention, said object is achieved by means of a converter according to claim 1 and a method according to claim 19.

According to the inventive solution, the derivative of the current through the current valves is measured and compared with a current derivative limit value, a short-circuit current being detected when the measured current derivative is equal to or exceeds the current derivative limit value during a length of time exceeding a stipulated time limit value.

The current derivative in a converter provided with a resonant circuit is normally low due to the inductor included in the resonant circuit. A higher current derivative consequently indicates a deviation from the normal condition. In connection with a short-circuit condition somewhere in the electric circuit of the converter, such a higher current derivative occurs. By measuring the current derivative, a short-circuit current can be detected at a very early stage so that required protective measures, including a turn-off of the semiconductor components of turn-off type of the current valves, can be carried out before the short-circuit current reaches such a high value that the current saturation level of the semiconductor components of turn-off type of the current valves is reached. Short intervals with high current derivatives may also occur in the current valves during normal operating conditions, for instance in connection with the recharging of the snubber capacitors. High current derivatives of short duration may also occur due to commutation oscillations, in particular after a turn-off of the semiconductor components of turn-off type of a current valve that takes place without assistance of the inductor and auxiliary valve included in the resonant circuit. A high current derivative caused by a short-circuit current does however have a longer duration than the high current derivatives that occasionally occur during normal operating conditions. By studying the duration of the high current derivatives, it will consequently be possible to distinguish high current derivatives caused by short-circuit currents from those not caused by short-circuit currents. A comparison of the duration of a detected high current derivative with a stipulated time limit value will consequently entail that high current derivatives occurring during normal operating conditions can be filtered out from high current derivatives caused by short-circuit currents.

According to a preferred embodiment of the invention, the respective current valve is provided with means for limiting the size of the current derivative in the current valve to a maximum value. Means for limiting the current derivative in the current valves of a converter are previously known in different designs and are used i.a. in order to prevent an overloading of the components of a current valve due to a too rapid current increase, i.e. a too high current derivative. Such a limitation of the current derivative to a maximum value in a current valve also implies that the current derivative of an occurring short-circuit current will be limited to the corresponding maximum value in the current valve. Hereby, it will normally lapse a certain time from the moment the short-circuit current occurs in the current valve to the moment the current saturation level is reached in the semiconductor components of turn-off type of the current valve. This time interval can consequently be used so as to for instance effectuate a turn-off of the current valve in question.

According to a further preferred embodiment of the invention, at least one of the circuits, with a semiconductor component of turn-off type and a rectifying component connected in anti-parallel therewith, included in a current valve is provided with a measuring member for measuring of current derivative connected in series with the semiconductor component of turn-off type included in this circuit and in parallel with the snubber capacitor belonging to the circuit. In this manner, only the derivative of the current through said circuit is measured and not the derivative of the current through the snubber capacitor belonging to the circuit. Hereby, a registration by the measuring member of the high current derivatives caused by the above mentioned commutation oscillations is avoided.

According to a particularly preferred embodiment of the invention, the current strength in the current valves is also measured, a short-circuit current being detected when the measured current strength exceeds a stipulated current strength limit value. Hereby, improved protection possibilities are obtained in connection with short-circuit currents caused by a current valve being current carrying due to an erroneous turn-on or due to any other error at the same time as a current valve with opposite polarity is in turned-on state. In connection with such an error situation, there is a risk of the current strength in the initially current carrying current valve being on such a high normal level before the occurrence of the error situation that the current strength in this current valve in connection with the occurrence of the short-circuit current will reach so rapidly up to a level making a turn-off of the semiconductor components of turn-off type of the current valve impossible that there is no time to effectuate a turn-off of the current valve. By registering when the current strength of the initially current carrying current valve exceeds the normal level, there is however sufficient time to effectuate a turn-off of the current valve arranged in opposite polarity, the erroneous turn-on of which caused the short-circuit current, before the current strength in the last mentioned current valve reaches a level making a turn-off of the semiconductor components of turn-off type of this current valve impossible.

According to a further preferred embodiment of the invention, the control device is made, when the measured current strength exceeds the stipulated current strength limit value in one of the two parts of the series connection of current valves, to firstly initiate a turn-off of the semiconductor components of turn-off type of the current valves in the other part of the series connection, and thereafter with a stipulated time delay initiate a turn-off of the semiconductor components of turn-off type of the current valves in the part of the series connection where the measured current strength exceeded the stipulated current strength limit value. By a suitable choice of said time delay, it will be possible to secure that the turn-off of the erroneously turned on current valve will have time to result in a decrease of the current strength in the initially current carrying current valve to a level allowing a secure turn-off of its semiconductor components of turn-off type before the turn-off thereof is initiated.

According to a further preferred embodiment of the invention, a turn-on of a semiconductor component of turn-off type of a current valve is allowed in one of the parts of the series connection of current valves only if there has been received from all the control units in the other part of the series connection of current valves a confirmation of a received control signal concerning the turn-off of the associated semiconductor component of turn-off type and/or if there has been received from each current valve in the other part of the series connection of current valves a signal indicating that a blocking voltage has been detected in the rectifying components of the current valve. Hereby, an increased safety against current valves with mutually opposite polarity simultaneously being in turned-on state and thereby current carrying state is obtained.

Further preferred embodiments of the inventive converter and the inventive method will appear from the dependent claims and the subsequent description.

The inventive solution is generally applicable to converters of the type "soft switched converters", such as for instance to the above-mentioned types of converters provided with a resonant circuit. As further examples of converter types to which the inventive solution is applicable may be mentioned three level ARCP-converters of the type described for instance in "Three Level Auxiliary Resonant Pole Commutated Pole Inverter for High Power Applications", Cho J G, Baek J W, Yoo D W, Won C Y, IEEE, 1996, and quasi-resonant PWM-converters of the type described for instance in the patent document U.S. Pat. No. 5,572,418.

BRIEF DESCRIPTION OF THE DRAWINGS

The invention will in the following be more closely described by means of embodiment examples, with reference to the appended drawings. It is shown in.

DETAILED DESCRIPTION OF PREFERRED EMBODIMENTS

Figure 1:
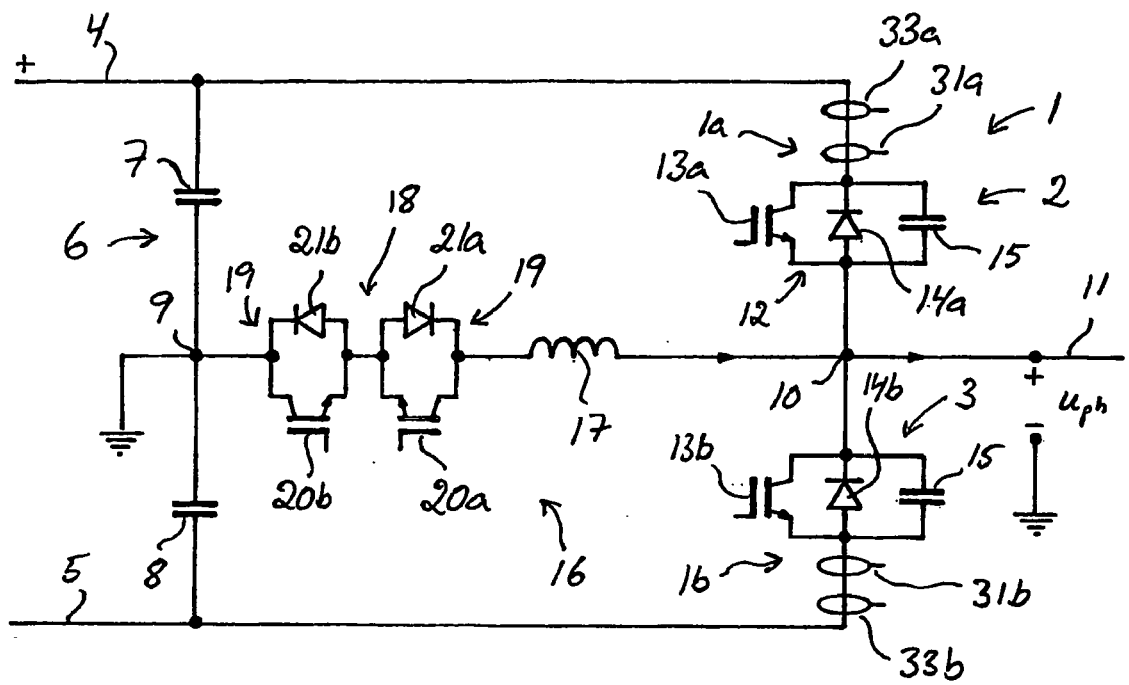
FIG. 1 a simplified circuit diagram illustrating a converter according to a first embodiment of the invention, FIG. 2 a simplified circuit diagram illustrating a converter according to a second embodiment of the invention, FIG. 3 a simplified circuit diagram illustrating a converter according to a third embodiment of the invention, FIG. 4 a simplified circuit diagram illustrating a solution for limiting the size of the current derivative in a current valve to a maximum value stipulated in advance, FIG. 5 curves illustrating the development of the current through a current valve at three different processes, FIG. 6 curves illustrating the development of the current through two current valves arranged in opposite polarity in connection with a short-circuit situation, and the corresponding development of the voltage between the gate and the emitter of a semiconductor component of turn-off type included in the respective current valve, and FIG. 7 a simplified block diagram illustrating a control system for effectuation of the inventive method.
Figure 2:
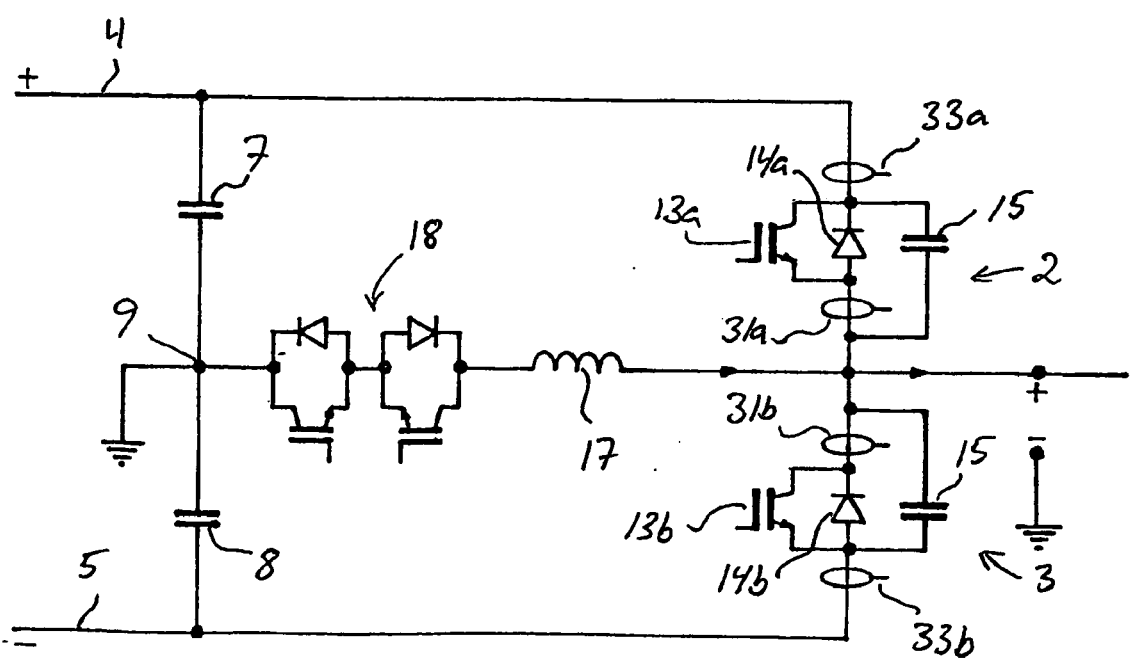
Figure 3:
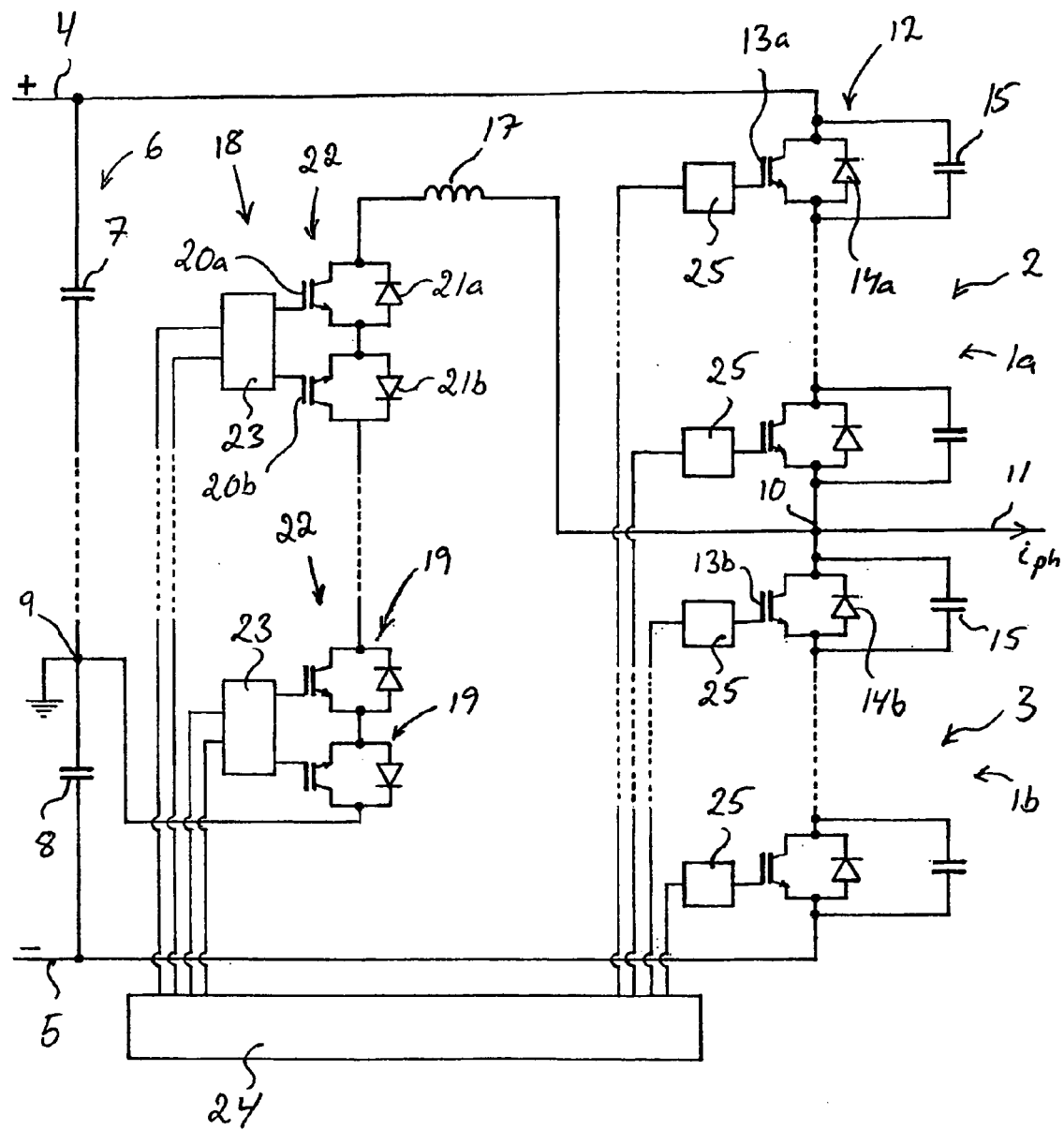

Converters according to different embodiments of the invention are illustrated in FIGS. 1–3. The respective converter is here a so-called VSC-converter. In FIGS. 1–3, only the part of the converter that is connected to one phase of an alternating voltage phase line is shown, the number of phases normally being three, but this may also constitute the entire converter when it is connected to a single phase alternating voltage network. The shown part of the converter constitutes a so-called phase leg, and a converter adapted for instance to a three-phase alternating voltage network comprises three phase legs of the type shown.

The phase leg of the converters 1 illustrated in FIGS. 1–3 has two current valves 2, 3 connected in series between the two poles 4, 5 of a direct voltage side of the converter. A direct voltage intermediate link 6 comprising at least two so-called intermediate link capacitors is provided between the two poles 4, 5. In the illustrated converters, the intermediate link 6 comprises two series connected intermediate link capacitors 7, 8. A midpoint 9 between these capacitors 7, 8 is here, as customary, connected to ground, so as to provide the potentials $+U_d/2$ and $-U_d/2$, respectively, at the respective pole, $U_d$ being the voltage between the two poles 4, 5. The grounding point 9 may however be excluded, for instance in SVC-applications.

A midpoint 10 of the series connection between the two current valves 2, 3, which constitutes the phase output of the converter, is connected to an alternating voltage phase line 11. In this manner, said series connection is divided into two equal parts 1a, 1b with a current valve 2 and 3, respectively, in each such part. In the embodiment with three phase legs, the converter consequently comprises three phase outputs, which are connected to a respective alternating voltage phase line of a three-phase alternating voltage network. The phase outputs are normally connected to the alternating voltage network via electric equipment in the form of breakers, transformers etc.

In the embodiments shown in FIGS. 1 and 2, the respective current valve 2, 3 is provided with a circuit 12, comprising a semiconductor component 13a, 13b of turn-off type, such as an IGBT, an IGCT, a MOSFET, a JFET, an MCT or a GTO, and a rectifying component 14a, 14b in the form of a diode, a so-called free wheeling diode, connected in anti-parallel therewith. Each of the current valves 2, 3 is provided with a capacitive member 15, here denominated snubber capacitor, connected in parallel with the semiconductor component 13a, 13b of turn-off type included in the current valve.

As indicated above, each current valve may comprise a semiconductor element of turn-off type built up of several series connected semiconductor components of turn-off type and a rectifying member built up of several series connected rectifying components. These semiconductor components of turn-off type and rectifying components are in the respective current valve 2, 3 arranged in several series connected circuits, such as will be described more closely with reference to FIG. 3.

In connection with the turn-off of a semiconductor component 13a, 13b of a current valve, the snubber capacitor 15 that is connected across this semiconductor component will be charged. If the snubber capacitor 15 keeps this charge when the semiconductor component subsequently is turned on, turn-on losses will ensue in the semiconductor component. In order to eliminate or at least reduce these turn-on losses, and make possible the use of high switching frequencies, the snubber capacitors 15 are included in a resonant circuit 16. Hereby, it will be possible to accomplish a decharge of the snubber capacitors 15 of a current valve when the semiconductor components 13a, 13b of the current valve are to be turned on, so that the voltage across the respective semiconductor component is equal to or close to zero when it is turned on, whereby the turn-on losses are limited.

It is also possible to include a capacitor arranged between the phase output 10 and the midpoint 9 of the direct voltage intermediate link in the resonant circuit 16.

The converters illustrated in FIGS. 1–3 are of the type denominated ARCP-converter. The resonant circuit 16 is here of so-called quasi-resonant type, which implies that the resonance only is initiated when the current is to be commutated between two current valves, i.e. when the voltage on the phase output of the converter is to be changed-over.

In the embodiment shown in FIG. 1 and FIG. 2, respectively, the resonant circuit 16 comprises a series connection of an inductor 17 and an auxiliary valve 18 arranged between the phase output 10 and the midpoint 9 of said series connection of intermediate link capacitors 7, 8. The auxiliary valve 18 here comprises a set of two series connected auxiliary valve circuits 19, each of which comprising a semiconductor component 20a, 20b of turn-off type, such as an IGBT, an IGCT, a MOSFET, a JFET, an MCT or a GTO, and a rectifying component 21a, 21b in the form of a diode connected in anti-parallel therewith. The semiconductor components 20a, 20b of turn-off type of the two auxiliary valve circuits 19 are arranged in opposite polarity in relation to each other. This auxiliary valve 18 constitutes a bi-directional valve that can be made to conduct in one or the other direction.

In this description and the subsequent claims, the expression auxiliary valve refers to a current valve included in the resonant circuit 16 of the converter.

The auxiliary valve 18 may also comprise several series connected sets of auxiliary valve circuits if considered appropriate, as illustrated in FIG. 3. In the embodiment illustrated in FIG. 3, the resonant circuit comprises an auxiliary valve 18 comprising several series connected sets 22 of auxiliary valve circuits, where each set comprises two series connected auxiliary valve circuits 19 of the type described above. Only two series connected sets 22 of auxiliary valve circuits of the auxiliary valve 18 are shown in FIG. 3, but the number of such sets may be considerably larger than that. The number of sets of auxiliary valve circuits in the auxiliary valve 18 may be optimized independently of the number of series connected circuits 12 in the current valves 2, 3, and depends i.a. on the voltage the auxiliary valve is to be able to hold in the blocking state and the characteristics of the individual semiconductor components 20a, 20b that are being used. Generally, it can be observed that the auxiliary valve 18 in the blocking state only has to hold half the pole voltage, i.e. $U_d/2$, in contrast to the current valves 2, 3, each of which has to be dimensioned so as to be able to hold the entire pole voltage $U_d$ in the blocking state.

In the embodiment illustrated in FIG. 3, the respective current valve 2, 3 comprises, in accordance with the above-indicated, several series connected circuits 12, each of which circuits comprising a semiconductor component 13a, 13b of turn-off type and a rectifying component 14a, 14b in the form of a diode connected in anti-parallel therewith. In FIG. 3 only two series connected circuits 12 of the type described above are shown in the respective current valve 2, 3, but the number of series connected circuits 12 may of course be larger. Depending i.a. on the voltage for which the converter is designed, the number of said series connected circuits 12 in the respective current valve 2, 3 may extend from two up to several hundred.

Each one of these series connected circuits 12 of the respective current valve 2, 3 is provided with a snubber capacitor 15 connected in parallel with the semiconductor component 13a, 13b of turn-off type included in the circuit. The capacitance of the respective snubber capacitor 15 must be so high that a good voltage distribution between the semiconductor components 13a, 13b of turn-off type included in the respective current valve is made possible in connection with a turn-off of the semiconductor components of turn-off type of a current valve. The choice of capacitance of the snubber capacitors 15 is adapted from case to case and depends i.a. on the current-handling capacity of the semiconductor components 13a, 13b of turn-off type and the rectifying components 14a, 14b.

Each set 22 of auxiliary valve circuits 19 in the auxiliary valve 18 is suitably, as illustrated in FIG. 3, provided with its own control unit 23, which is adapted to control the turn-on and turn-off of the semiconductor components 20a, 20b of turn-off type included in the set, all control units 23 of the auxiliary valve being connected to a common control device 24, which is adapted to send control signals to all these control units 23. Hereby a simultaneous control of all the auxiliary valve circuits 19 of the auxiliary valve is secured.

It is further preferred that each of the semiconductor components 13a, 13b of turn-off type included in the current valves 2, 3 of the converter, as illustrated in FIG. 3, is provided with its own control unit 25, which is adapted to control the turn-on and turn-off of the semiconductor component 13a, 13b, all control units 25 of the current valves being connected to a common control device 24, which is adapted to send control signals to all the control units 25 included in a current valve 2, 3. Hereby a simultaneous control of all the semiconductor components 13a, 13 of a current valve is secured. The control units 23 of the auxiliary valve and the control units 25 of the current valves are here connected to one and the same control unit 24. The control units 23, 25 are preferably adapted, when they receive a turn-on signal or a turn-off signal from the control device 24, to send back a signal to the control device 24 as a confirmation that they have received said turn-on signal/turn-off signal.

The converters illustrated in FIGS. 1 and 2 are intended to be provided with a control device 24 and control units 23, 25 corresponding to those schematically illustrated in FIG. 3. These are however not shown in FIG. 1 and FIG. 2.

Figure 7:
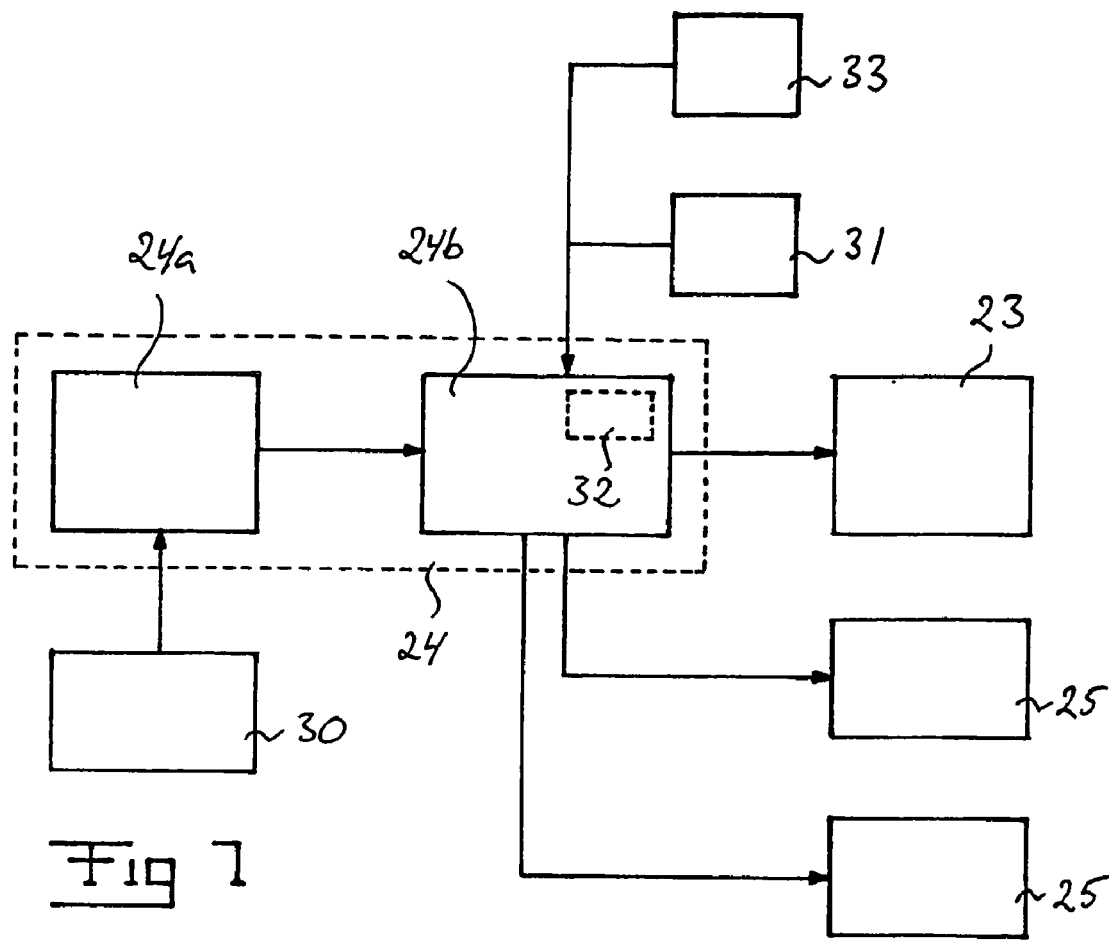

The inventive converter is preferably controlled with PWM-technique (PWM=Pulse Width Modulation), the control device 24 being supplied with signals representing the desired commutation moments from a modulator 30, schematically illustrated in FIG. 7.

The inventive converter is provided with a device 31 for measuring the derivative $dI/dt$ of the current through the current valves 2, 3, and a detection device 32 co-operating with said measuring device 31 for detecting a short-circuit in the converter. These devices are schematically illustrated in FIG. 7. The detection device 32 is adapted to detect a short-circuit current when the current derivative $dI/dt$ measured by the measuring device 31 is equal to or exceeds a stipulated current derivative limit value $dI/dt_{lim}$ during a length of time exceeding a stipulated time limit value $t_{lim}$. The current derivative limit value $dI/dt_{lim}$ is suitably chosen so that it is just above the normal value of the derivative of the current through a current valve during a normal commutation process. By studying how long time the derivative $dI/dt$ of the current through a current valve is above the normal value, increased current derivative values caused by short-circuit currents may be distinguished from such increased current derivative values that may occur during normal operating conditions, as previously described. The time limit value $t_{lim}$ is so chosen that increased current derivative values occurring during normal operating conditions will normally have time to decrease to a level below the current derivative limit value $dI/dt_{lim}$ within the time interval corresponding to the time limit value $t_{lim}$, whereby such increased current derivative values are filtered out and will not cause an erroneous detection of a short-circuit current.

The detection device 32 may be integrated in the control device 24, as illustrated in FIG. 7, or constitute a unit separate therefrom. It is also possible to have the detection device 32 and the measuring device 31 integrated in a common unit.

According to a first alternative, the measuring device 31 is adapted, when the current derivative dI/dt measured by the measuring device is equal to or exceeds the current derivative limit value $dI/dt_{lim}$, to send signals indicating this to the detection device 32. In this case, the comparison between the measured current derivative dI/dt and the current derivative limit value $dI/dt_{lim}$ consequently takes place in the measuring device itself and this sends signals to the detection device 32 when the measured current derivative dI/dt is equal to or exceeds the current derivative limit value $dI/dt_{lim}$. According to a second alternative, the measuring device 31 is adapted, preferably continuously, to send measuring signals to the detection device 32 indicating the value of the measured current derivative dI/dt. In the latter case, the comparison between the measured current derivative dI/dt and the current derivative limit value $dI/dt_{lim}$ consequently takes place in the detection device 32. Said measuring device 31 comprises at least one first measuring member 31a for measuring the current derivative dI/dt in a first one 1a of said two parts of the series connection of current valves, and a second measuring member 31b for measuring the current derivative dI/dt in the other part 1b of the series connection of current valves.

According to a particularly preferred embodiment, at least one of the circuits 12, with a semiconductor component of turn-off type and a rectifying component connected in anti-parallel therewith, included in the current valves comprises a measuring member 31a, 31b for measuring of current derivative dI/dt connected in series with the semiconductor component 13a, 13b of turn-off type included in the circuit and in parallel with the snubber capacitor 15 belonging to the circuit 12, as illustrated in FIG. 2. In the embodiment illustrated in FIG. 2, the measuring member 31a, 31b is also connected in series with the rectifying component 14a, 14b included in the circuit.

Figure 4:
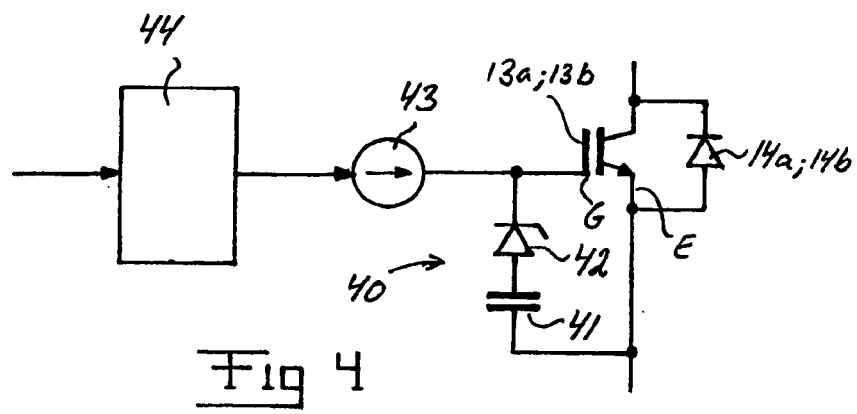

It is further preferred that the respective current valve 2, 3 is provided with means for limiting the size of the derivative dI/dt of the current through the current valve 2, 3 to a maximum value $dI/dt_{max}$. It is realized that the current derivative limit value $dI/dt_{lim}$ is not allowed, in this case, to be above the maximum value $dI/dt_{max}$, i.e. the current derivative limit value $dI/dt_{lim}$ is so chosen that it is equal to or below this maximum value $dI/dt_{max}$. According to a preferred embodiment, see FIG. 4, this means comprises a capacitor 41 in each one of the semiconductor components 13a, 13b of turn-off type of the current valve, which capacitor is arranged between the gate G and the emitter E of the respective semiconductor component 13a, 13b of turn-off type. The total capacitance between the gate and the emitter, i.e. the capacitor 41 together with the self-capacitance of the semiconductor component of turn-off type, will together with the size of the control current determine the derivative of the voltage between the gate and the emitter, which in its turn determines the current derivative dI/dt across the semiconductor component of turn-off type. By choosing a desired value of the capacitance of the capacitor 41 between the gate and the emitter, the current derivative is limited to a desired maximum value. The maximum value $dI/dt_{max}$ is in this case suitably adapted in such a manner that sufficient time is secured for detection of a short-circuit current and effectuation of a turn-off so as to prevent a short-circuit current from raising above the level where a turn-off is guaranteed. At a certain voltage level, $V_{th}$, the semiconductor component of turn-off type starts to conduct. So as to not unnecessarily increase the turn-on delay and the charge required for the turn-on operation, a zener-diode 42 may be arranged between the gate G and the emitter E and in series with said capacitor 41, which zener-diode starts to conduct when the voltage on the gate is approximately equal to $V_{th}$. This is done by choosing a zener-diode that starts to conduct at a suitable voltage. A current source 43 is also illustrated in FIG. 4, which current source by means of a control member 44 is controlled to supply current to the gate G during the turn-on of the associated semiconductor component 13a, 13b of turn-off type. The current source 43 and the control member 44 are included in a control unit 25 of the previously described type. A current derivative limiting means of the above described type is disclosed in the patent document U.S. Pat. No. 5,828,539.

In order to prevent an overloading of the semiconductor components 13a, 13b of turn-off type of the current valves, the control device 24 should be adapted to initiate a turn-off of the semiconductor components 13a, 13b of turn-off type of the current valves 2, 3 when the detection device 32 detects a short-circuit current as a consequence of the measured current derivative dI/dt being equal to or exceeding the current derivative limit value $dI/dt_{lim}$ during a length of time exceeding the stipulated time limit value $t_{lim}$.

Figure 5:
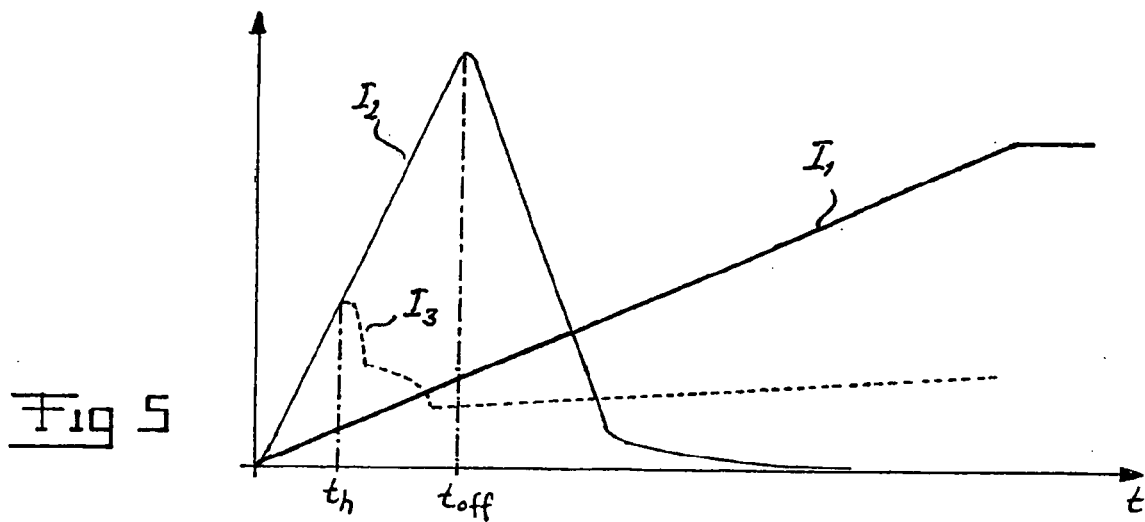

Curves illustrating the development of the current through a current valve at three different processes are illustrated in FIG. 5. A first curve, denoted $I_1$ in FIG. 5, refers to a normal soft turn-on of the semiconductor components of turn-off type of the current valve. A second curve, denoted $I_2$ in FIG. 5, refers to the development of the current in an error case with a short-circuit current occurring in the current valve. As appears from the curves $I_1$ and $I_2$, the current through the current valve raises considerably more rapid, i.e. the current derivative dI/dt is considerably larger, in the error case than in the case with the normal soft turn-on. In the error case, the size of the current derivative is limited to the previously mentioned maximum value $dI/dt_{max}$. The curve $I_2$ represents an error case where a turn-off of the semiconductor components of turn-off type of the current valve is effectuated at the moment $t=t_{off}$, whereupon the current through the current valve goes towards zero. A third curve, denoted $I_3$ in FIG. 5, refers to a hard turn-on of a current valve. Such a hard turn-on will occur at the starting up of the converter and in connection with a temporary erroneous timing of the turn-off or turn-on of a current valve or an auxiliary valve during a commutation process. In the case with a hard turn-on, a high current derivative, the size of which being limited to said maximum value $dI/dt_{max}$, will briefly, in the time interval up to $t=t_h$, occur in the current through the current valve. It is realized that the current derivative limit value $dI/dt_{lim}$ is to be located between the values of the current derivative during the current build-up phase of the curves $I_1$ and $I_2$. It is further realized that the time limit value $t_{lim}$ should be located just above $t_h$.

According to a particularly preferred embodiment of the invention, the converter also comprises a device 33 co-operating with the detection device 32 for measuring the strength I of the current through the current valves 2, 3, the detection device 32 being arranged to detect a short-circuit current when the measured current strength exceeds a stipulated current strength limit value $I_{lim}$. The current strength limit value $I_{lim}$ is suitably so chosen that it is located just above the highest expected value of the load current.

According to a first alternative, the measuring device 33 is adapted, when the current strength I measured by the measuring device exceeds the current strength limit value $I_{lim}$, to send signals indicating this to the detection device 32. In this case, the comparison between the measured current strength and the current strength limit value $I_{lim}$ consequently takes place in the measuring device itself, and this sends signals to the detection device 32 when the measured current strength exceeds the current strength limit value $I_{lim}$. According to a second alternative, the measuring device 33 is adapted, preferably continuously, to send measuring signals to the detection device 32 indicating the value of the measured current strength. In the latter case, the comparison between the measured current strength and the current strength limit value $I_{lim}$ consequently takes place in the detection device 32.

Said measuring device 33 comprises at least one first measuring member 33a for measuring the current strength in a first one 1a of said two parts of the series connection of current valves 2, 3, and a second measuring member 33b for measuring the current strength in the other part 1b.

By a comparison of the current strength with a stipulated current strength limit value, improved protection possibilities are, as previously mentioned, obtained in connection with short-circuit currents caused by a current valve due to an erroneous turn-on or due to any other error becoming current carrying at the same time as a current valve with opposite polarity is in the turned-on state, i.e. in case the current valve 2, 3 in one 1a, 1b of said two parts of the series connection of current valves becomes current carrying at the same time as the current valve 3, 2 in the other part 1b, 1a is in the turned-on state.

In order to prevent an overloading of the semiconductor components 13a, 13b of turn-off type of the current valves, the control device 24 should be adapted to initiate a turn-off of the semiconductor components 13a, 13b of turn-off type of the current valves 2, 3 when the detection device 32 detects a short-circuit current as a consequence of the measured current strength I exceeding the stipulated current strength limit value $I_{lim}$. In connection with an error situation of the type here in question, there is, as previously mentioned, a risk that the current strength in the initially current carrying current valve is on such a high normal level before the occurrence of the error situation that the current strength in this current valve in connection with the occurrence of the short-circuit current almost immediately will reach up to a level making a turn-off of the semiconductor components of turn-off type of the current valve impossible. As a consequence thereof, the control device 24 is suitably adapted, when the measured current strength I exceeds the stipulated current strength limit value $I_{lim}$ in one of the parts 1a, 1b of the series connection of current valves, to firstly initiate a turn-off of the semiconductor components 13a, 13b of turn-off type of the current valve in the other part 1b, 1a of the series connection and thereafter initiate a turn-off of the semiconductor components 13a, 13b of turn-off type of the current valve in the part 1a, 1b where the measured current strength I exceeded the stipulated current strength limit value $I_{lim}$. So as to secure that this takes place, the control device 24 is preferably adapted to initiate a turn-off of the semiconductor components 13a, 13b of turn-off type of the current valve in the part 1a, 1b of the series connection where the measured current strength I exceeded the stipulated current strength limit value $I_{lim}$ with a stipulated time delay after the initiation of the turn-off of the semiconductor component 13b, 13a of turn-off type of the current valve in the other part 1b, 1a.

Figure 6:
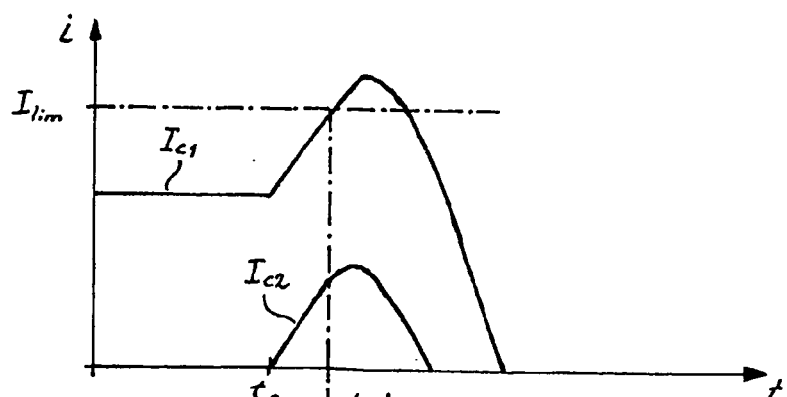
Figure 6:
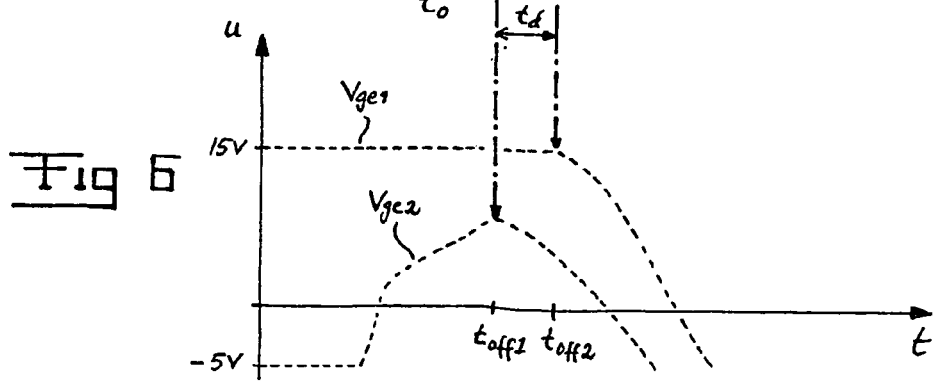

Curves illustrating the development of the current through two current valves arranged in opposite polarity in connection with a short-circuit situation and the corresponding development of the voltage between the gate and the emitter of a semiconductor component of turn-off type included in the respective current valve are shown in FIG. 6. The curves $I_{c1}$ and $I_{c2}$ show the development of the current through the initially current carrying current valve and the current valve that is erroneously turned on and thereby causes the short-circuit current, respectively. The curves $V_{ge1}$ and $V_{ge2}$ show the development of the voltage between the gate and the emitter of a semiconductor component of turn-off type included in the initially current carrying current valve and the current valve that is erroneously turned on, respectively. The line $I_{lim}$ denotes the previously mentioned current strength limit value. At the moment $t=t_0$ the erroneously turned on current valve becomes current carrying, whereupon the current through the initially current carrying current valve rapidly raises. When the current has raised to the level $I_{lim}$, a detection of short-circuit current takes place, whereupon the control device 24 initiates a turn-off of the erroneously turned on current valve at the moment $t=t_{off1}$. After a predetermined time delay $t_d$, a turn-off of the initially current carrying current valve is initiated at the moment $t=t_{off2}=t_{off1}+t_d$. In this manner, the current through the initially current carrying current valve will have time to decrease to a level that is acceptable for the turn-off of the semiconductor components of turn-off type of the current valve before the effectuation of the turn-off of the current valve.

According to a preferred embodiment of the invention, the control device 24 is adapted to allow a turn-on of a semiconductor component 13a, 13b of turn-off type of a current valve in one of the parts 1a, 1b of the series connection of current valves only if it has received from all the control units 25 in the other part 1b, 1a of said series connection a confirmation of received control signal concerning the turn-off of the associated semiconductor component 13b, 13a off turn-off type. Hereby, the risks of an erroneous turn-on of a current valve resulting in a short-circuit current through the series connected current valves are minimized. A further security against this is obtained by making the control device 24b being adapted to allow a turn-on of a semiconductor component 13a, 13b of turn-off type of a current valve in one of the parts 1a, 1b of said series connection only if it has received from the current valve in the other part 1b, 1a of the series connection a signal indicating that a blocking voltage has been detected in the rectifying component/components 14b, 14a of the current valve. In the latter case, the respective current valve 2, 3 must of course be provided with members for detection of blocking voltage in the rectifying component/components 14a, 14b of the current valve. The members for detection of blocking voltage in the rectifying components 14a, 14b of the current valves suitably consist of the control units 25. It will namely be possible to register a voltage at the control unit 25 of a semiconductor component of turn-off type when a blocking voltage occurs across the rectifying component 14a, 14b connected in parallel with the semiconductor component 13a, 13b of turn-off type.

The signals indicating a blocking voltage may also be used as a back-up for the ordinary and above-described short-circuit detection in that measures for protecting the semiconductor components of turn-off type of the current valves in connection with a short-circuit situation automatically are initiated if no blocking voltage is indicated in a current valve arranged in opposite polarity within a short predetermined period of time after the moment a turn-on signal has been sent to a current valve. As an alternative to said back-up method, the voltage development between the two electrodes of the semiconductor components of turn-off type of the current valve that is being turned on could be measured during the turn-on process for detection of a short-circuit situation. A method of the last mentioned type is more closely described in the patent document U.S. Pat. No. 5,990,724.

As schematically illustrated in FIG. 7, the control device 24 is suitably divided into two separate units, here denoted with 24a and 24b. A first unit 24a constitutes a central processor unit adapted, guided by signals from the PWM-modulator 30, to calculate the moments and sequence for the turn-on and turn-off of the semiconductor components 20a, 20b of turn-off type of the auxiliary valve and the semiconductor components 13a, 13b of turn-off type of the current valves. A second unit 24b is responsible for sending turn-on and turn-off signals to intended control units 23, 25 of the auxiliary valve or the current valves at correct moments guided by the moments and the sequence determined by the first unit 24a. The second unit 24b is suitably responsible for the above-mentioned protective measures for avoiding an overloading of the semiconductor components 13a, 13b of turn off type of the current valves, so that the measures can be initiated as fast as possible and with as few signal processing steps as possible. Consequently, the detection device 32 is suitably adapted to communicate with or integrated in said second unit 24b.

When an error situation implying a risk of overloading of the semiconductor components of turn-off type of the auxiliary valve is registered, the commutation sequences controlled by the PWM-modulator are suitably interrupted in that the signal transmission from the modulator 30 to the above-mentioned first unit 24a of the control device 24 and/or from said first unit 24a to the above-mentioned second unit 24b of the control device 24 is blocked.

It is realized that the turn-off and turn-on, respectively, of a current valve as described above and as indicated in the claims, refer to the simultaneous turn-off and turn-on, respectively, of all the semiconductor components 13a, 13b of turn-off type of a current valve in those cases where the respective current valve comprises several series connected circuits 12 of previously indicated type.

The invention is of course not in any way restricted to the preferred embodiments described above, on the contrary many possibilities to modifications thereof should be apparent to a person skilled in the art without departing from the basic idea of the invention as defined in the appended claims. Each phase leg of the converter could for instance comprise more than two series connected current valves, for instance four current valves with two on each side of the phase output.

The invention claimed is:

1. A converter comprising:
   a series connection of at least two current valves (2, 3) arranged between two poles (4, 5), a positive and a negative, of a direct voltage side of the converter, each of which current valves comprising at least one circuit (12) provided with a semiconductor component (13a, 13b) of turn-off type and a rectifying component (14a, 14b) connected in anti-parallel therewith, an alternating voltage phase line (11) being connected to a mid-point (10), denominated phase output, of the series connection between two current valves while dividing the series connection into two equal parts (1a, 1b),
   a resonant circuit (16) comprising snubber capacitors (15), which are connected in parallel with a respective one of the semiconductor components (13a, 13b) of turn-off type of the current valves, and at least one inductor (17) and an auxiliary valve (18) provided with semiconductor components (20a, 20b) of turn-off type for recharging said snubber capacitors (15) in connection with a commutation of the phase current, and
   a control device (24) for controlling the turn-on and turn-off of the semiconductor components (13a, 13b) of turn-off type of the current valves, wherein the converter comprises a device (31) for measuring the derivative (dI/dt) of the current through the current valves (2, 3), and a detection device (32) co-operating with said measuring device (31) for detecting a short-circuit in the converter, the detection device (32) being adapted to detect a short-circuit current when the current derivative (dI/dt) measured by the measuring device (31) is equal to or exceeds a stipulated current derivative limit value (dI/dt$_{lim}$) during a length of time exceeding a stipulated time limit value (t$_{lim}$).

2. A converter according to claim 1, wherein the respective current valve (2, 3) is provided with means (40) for limiting the size of the current derivative (dI/dt) of the current valve (2, 3) to a maximum value (dI/dt$_{max}$).

3. A converter according to claim 2, wherein the means (40) of the respective current valve (2, 3) for limiting the size of the current derivative (dI/dt) of the current valve (2, 3) to a maximum value (dI/dt$_{max}$) comprises a capacitor (41) in each one of the semiconductor components (13a, 13b) of turn-off type of the current valve arranged between the gate (G) and the emitter (E) of the respective semiconductor component (13a, 13b) of turn-off type.

4. A converter according to claim 3, wherein the means (40) further comprises a zener-diode (42) in each one of the semiconductor components (13a, 13b) of turn-off type of the current valve arranged between the gate (G) and the emitter (E) of the respective semiconductor component (13a, 13b) of turn-off type in series with the capacitor (41) arranged between the gate and the emitter.

5. A converter according to claim 1, wherein the measuring device (31) is adapted, when the current derivative (dI/dt) measured by the measuring device (31) is equal to or exceeds the current derivative limit value (dI/dt$_{lim}$), to send signals indicating this to the detection device (32).

6. A converter according to claim 1, wherein the measuring device (31) is adapted to send measuring signals to the measuring device (32) indicating the value of the measured current derivative (dI/dt).

7. A converter according to claim 1, wherein the measuring device (31) comprises a first measuring member (31a) for measuring the current derivative (dI/dt) in a first one (1a) of said two parts of the series connection of current valves (2, 3), and a second measuring member (31b) for measuring the current derivative (dI/dt) in a second one (1b) of said two parts of the series connection of current valves (2, 3).

8. A converter according to claim 1, wherein at least one of the circuits (12) with a semiconductor component (13a, 13b) of turn-off type and a rectifying component (14a, 14b) connected in anti-parallel therewith included in the current valves is provided with a measuring member (31a, 31b) for measuring the current derivative (dI/dt) connected in series with the semiconductor component (13a, 13b) of turn-off type included in the circuit (12) and in parallel with the snubber capacitor (15) belonging to the circuit (12).

9. A converter according to claim 1, wherein the control device (24) is adapted to initiate a turn-off of the semiconductor components (13a, 13b) of turn-off type of the current valves (2, 3) when the detection device (32) detects a short-circuit current as a consequence of the measured current derivative (dI/dt) being equal to or exceeding the current derivative limit value (dI/dt$_{lim}$) during a length of time exceeding the stipulated time limit value (t$_{lim}$).

10. A converter according to claim 1, wherein the converter comprises a device (33) co-operating with the detection device (32) for measuring the current strength (I) in the current valves (2, 3), the detection device (32) being adapted to detect a short-circuit current when the measured current strength exceeds a stipulated current strength limit value (I$_{lim}$).

11. A converter according to claim 10, wherein the device (33) for measuring of current strength (I) comprises a first measuring member (33a) for measuring the current strength (I) in a first one (1a) of said two parts of the series connection of current valves (2, 3), and a second measuring member (33b) for measuring the current strength (I) in a second one (1b) of said two party of the series connection of current valves (2, 3).

12. A converter according to claim 11, wherein the control device (24) is adapted to initiate a turn-off of the semiconductor components (13a, 13b) of turn-off type of the current valves (2, 3) when the detection device (32) detects a short-circuit current as a consequence of the measured current strength (I) exceeding the stipulated current strength limit value (I$_{lim}$).

13. A converter according to claim 10, wherein, the control device (24) is adapted to initiate a turn-off of the semiconductor components (13a, 13b) of turn-off type of the current valves (2, 3) when the detection device (32) detects a short-circuit current as a consequence of the measured current strength (I) exceeding the stipulated current strength limit value (I$_{lim}$).

14. A converter according to claim 13, wherein the control device (24) is adapted, when the measured current strength (I) exceeds the stipulated current strength limit value (I$_{lim}$) in one (1a, 1b) of said two parts of the series connection of current valves (2, 3), to firstly initiate a turn-off of the semiconductor components (13b, 13a) of turn-off type of the current valves in the other part (1b, 1a) of the series connection and thereafter initiate a turn-off of the semiconductor components (13a, 13b) of turn-off type of the current valves in the part (1a, 1b) of the series connection where the measured current strength (I) exceeded the stipulated current strength limit value (I$_{lim}$).

15. A converter according to claim 14, wherein the control device (24) is adapted to initiate a turn-off of the semiconductor components (13a, 13b) of turn-off type of the current valves in the part (1a, 1b) of the series connection where the measured current strength (I) exceeded the stipulated current strength limit value (I$_{lim}$) with a stipulated time delay (t$_d$) after the initiation of the turn-off of the semiconductor components (13b, 13a) of turn-off type of the current valves in the other part (1b, 1a) of the series connection.

16. A converter according to claim 1, wherein each semiconductor component (13a, 13b) of turn-off type of the current valves (2, 3) is provided with a control unit (25) adapted to execute a turn-on and turn-off of the associated semiconductor component (13a, 13b) of turn-off type guided by control signals received from the control device (24), the respective control unit (25) being adapted to send back to the control device (24) a confirmation in connection with the receipt of a control signal, and that the control device (24) is adapted to allow a turn-on of a semiconductor component (13a, 13b) of turn-off type of a current valve in one of the parts of the series connection of current valves (2, 3) only if it has received from all the control units (25) in the other part of the series connection of current valves (2, 3) a confirmation of received control signal concerning the turn-off of the associated semiconductor component (13b, 13a) of turn-off type.

17. A converter according to claim 1, wherein the respective current valve (2, 3) comprises members (25) for detecting a blocking voltage in the rectifying component/components (14a, 14b) of the current valve, and that the control device (24) is adapted to allow a turn-on of a semiconductor component (13a, 13b) of turn-off type in one of the parts (1a, 1b) of the series connection of current valves (2, 3) only if it has received from each current valve in the other part (1b, 1a) of the series connection of current valves (2, 3) a signal indicating that, a blocking voltage has been detected in the rectifying component/components (14b, 14a) of the current valve.

18. A converter according to claim 1, the respective current valve (2, 3) comprises members (25) for detecting a blocking voltage in the rectifying component/components (14a, 14b) of the current valve, and that the control device (24) is adapted to initiate a turn-off of the semiconductor components (13a, 13b) of turn-off type of the current valves (2, 3) if no blocking voltage has been detected in a current valve within a predetermined period of time after the moment a turn-on signal has been sent to a current valve arranged in opposite polarity.

19. A converter according to claim 1, wherein the converter is an ARCP-converter, which comprises a series connection of at least two intermediate link capacitors (7, 8) arranged between the two poles (4, 5) of the direct voltage side of the converter, the resonant circuit (16) comprising a series connection of an inductor (17) and an auxiliary valve (18) arranged between the phase output (10) and a midpoint (9) of said series connection of intermediate link capacitors (7, 8), which auxiliary valve (18) comprises at least two semiconductor components (20a, 20b) of turn-off type arranged in opposite polarity in relation to each other.

20. A method for controlling a converter, which converter comprises:
   a series connection of at least two current valves (2, 3) arranged between two poles (4, 5), a positive and a negative, of a direct voltage side of the converter, each of which current valves comprising at least one circuit (12) provided with a semiconductor component (13a, 13b) of turn-off type and a rectifying component (14a, 14b) connected in anti-parallel therewith, an alternating voltage phase line (11) being connected to a mid-point (10), denominated phase output, of the series connection between two current valves while dividing the series connection into two equal parts (1a, 1b),
   a resonant circuit (16) comprising snubber capacitors (15), which are connected in parallel with a respective one of the semiconductor components (13a, 13b) of turn-off type of the current valves, and at least one inductor (17) and an auxiliary valve (18) provided with semiconductor components (20a, 20b) of turn-off type for recharging said snubber capacitors (15) in connection with a commutation of the phase current, and
   a control device (24) for controlling the turn-on and turn-off of the semiconductor components (13a, 13b) of turn-off type of the current valves, wherein the derivative (dI/dt) of the current through the current valves (2, 3) is measured and compared with a current derivative limit value (dI/dt$_{lim}$), a short-circuit current being detected when the measured current derivative (dI/dt) is equal to or exceeds the current derivative limit value (dI/dt$_{lim}$) during a length of time exceeding a stipulated time limit value (t$_{lim}$).

21. A method according to claim 20, wherein the size of the current derivative (dI/dt) of the respective current valve (2, 3) is limited to a maximum value (dI/dt$_{max}$).

22. A method according to claim 21, wherein the size of the current derivative (dI/dt) of the respective current valve (2, 3) is limited to a maximum value (dI/dt$_{max}$) with the aid of a capacitor (41) in each one of the semiconductor components (13a, 13b) of turn-off type of the current valve arranged between the gate (G) and the emitter (E) of the respective semiconductor component (13a, 13b) of turn-off type, preferably in series with a zener-diode (42).

23. A method according to claim 21, the control device (24) is made to initiate a turn-off of the semiconductor components (13a, 13b) of turn-off type of the current valves (2, 3) when a short-circuit current has been detected as a consequence of the measured current derivative (dI/dt) being equal to or exceeding the current derivative limit value (dI/dt$_{lim}$) during a length of time exceeding the stipulated time limit value (t$_{lim}$).

24. A method according to claim 20, wherein the size of the current derivative (dI/dt) of the respective current valve (2, 3) is limited to a maximum value (dI/dt$_{max}$) with the aid of a capacitor (41) in each one of the semiconductor components (13a, 13b) of turn-off type of the current valve arranged between the gate (G) and the emitter (E) of the respective semiconductor component (13a, 13b) of turn-off type, preferably ire series with a zener-diode (42).

25. A method according to claim 24, the control device (24) is made to initiate a turn-off of the semiconductor components (13a, 13b) of turn-off type of the current valves (2, 3) when a short-circuit current has been detected as a consequence of the measured current derivative (dI/dt) being equal to or exceeding the current derivative limit value (dI/dt$_{lim}$) during a length of time exceeding the stipulated time limit value (t$_{lim}$).

26. A method according to claim 20, the control device (24) is made to initiate a turn-off of the semiconductor components (13a, 13b) of turn-off type of the current valves (2, 3) when a short-circuit current has been detected as a consequence of the measured current derivative (dI/dt) being equal to or exceeding the current derivative limit value (dI/dt$_{lim}$) during a length of time exceeding the stipulated time limit value (t$_{lim}$).

27. A method according to claim 20, wherein the current strength (I) in the current valves (2, 3) is measured, a short-circuit current being detected when the measured current strength exceeds a stipulated current strength limit value (I$_{lim}$).

28. A method according to claim 27, wherein the control device (24) is made to initiate a turn-off of the semiconductor components (13a, 13b) of turn-off type of the current valves (2, 3) when a short-circuit current has been detected as a consequence of the measured current strength (I) exceeding the stipulated current strength limit value (I$_{lim}$).

29. A method according to claim 28, wherein the control device (24) is made, when the measured current strength (I) exceeds the stipulated current strength limit value (I$_{lim}$) in one (1a, 1b) of said two parts of the series connection of current valves (2, 3), to firstly initiate a turn-off of the semiconductor components (13b, 13a) of turn-off type of the current valves in the other part (1b, 1a) of the series connection and thereafter initiate a turn-off of the semiconductor components (13) of turn-off type of the current valves in the part (1a, 1b) of the series connection where the measured current strength (I) exceeded the stipulated current strength limit value (I$_{lim}$).

30. A method according to claim 29, wherein the control device (24) is made to initiate a turn-off of the semiconductor components (13a, 13b) of turn-off type of the current valves in the part (1a, 1b) of the series connection where the measured current strength (I) exceeded the stipulated current strength limit value (I$_{lim}$) with a stipulated time delay after the initiation of the turn-off of the semiconductor components (13b, 13a) of turn-off type of the current valves in the other part (1b, 1a) of the series connection.

31. A method according to claim 20, wherein a turn-on and turn-off of the respective semiconductor component (13a, 13b) of turn-off type of the current valves (2, 3) is executed with the aid of a control unit (25) guided by control signals received from the control device (24), the respective control unit (25) sending back a confirmation to the control device (24) in connection with the receipt of a control signal, and that the control device (24) is made to allow a turn-on of a semiconductor component (13a, 13b) of turn-off type of a current valve in one of the parts of the series connection of current valves (2, 3) only if it has received from all the control units (25) in the other part of the series connection of current valves (2, 3) a confirmation of received control signal concerning the turn-off of the associated semiconductor component (13b, 13a) of turn-off type.

32. A method according to claim 20, wherein a blocking voltage in the rectifying component/components (14a, 14b) of the current valve is detected, and that the control device (24) is made to allow a turn-on of a semiconductor component (13a, 13b) of turn-off type of a current valve in one of the parts (1a, 1b) of the series connection of current valves (2, 3) only if it has received from each current valve in the other part (1b, 1a) of the series connection of current valves (2, 3) a signal indicating that a blocking voltage has been detected in the rectifying component/components (14b, 14a) of the current valve.

33. A method according to claim 20, wherein a blocking voltage of the rectifying component/components (14a, 14b) of the converter is detected, and that the control device (24) is made to initiate a turn-off of the semiconductor components (13a, 13b) of turn-off type of the current valves (2, 3) if no blocking voltage is detected in a current valve within a predetermined period of time after the moment a turn-on signal has been sent to a current valve arranged in opposite polarity.

* * * * *